United States Patent
Kosugi et al.

(10) Patent No.: US 12,259,773 B2
(45) Date of Patent: Mar. 25, 2025

(54) INFORMATION PROCESSING APPARATUS AND CONTROL METHOD

(71) Applicant: Lenovo (Singapore) Pte. Ltd., Singapore (SG)

(72) Inventors: Kazuhiro Kosugi, Kanagawa (JP); Masashi Nishio, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/345,187

(22) Filed: Jun. 30, 2023

(65) Prior Publication Data

US 2024/0013571 A1  Jan. 11, 2024

(30) Foreign Application Priority Data

Jul. 7, 2022  (JP) ................ 2022-109817

(51) Int. Cl.
  *G06F 1/3234*  (2019.01)
  *G06F 1/3231*  (2019.01)
  *G06F 21/84*  (2013.01)
(52) U.S. Cl.
  CPC .......... *G06F 1/3234* (2013.01); *G06F 1/3231* (2013.01); *G06F 21/84* (2013.01)
(58) Field of Classification Search
  None
  See application file for complete search history.

(56) References Cited

U.S. PATENT DOCUMENTS

| 9,781,106 B1* | 10/2017 | Vitus ............... G06F 21/316 |
| 10,025,380 B2* | 7/2018 | Hodge ............... G06F 3/013 |
| 2015/0193611 A1 | 7/2015 | Zhao et al. |
| 2017/0013194 A1* | 1/2017 | Lee ............... G06F 3/017 |

FOREIGN PATENT DOCUMENTS

| JP | 2016-148895 A | 8/2016 |
| JP | 2020184177 A | 11/2020 |

\* cited by examiner

*Primary Examiner* — Paul Yen
(74) *Attorney, Agent, or Firm* — Osha Bergman Watanabe & Burton LLP

(57) ABSTRACT

An information processing apparatus includes a memory which temporarily stores a program of an OS; a first processor which executes the program to implement functions of the OS; a second processor which detects a face area with a face captured therein from an image captured by an imaging unit. When the face area is no longer detected, the first processor performs first processing to limit the use of at least some of the functions of the OS for a predetermined first time, and when it is detected that the information processing apparatus is held by a user before the first time elapses, the first processor disables the first processing, and performs second processing to limit the use of at least some of the functions of the OS for a predetermined second time.

7 Claims, 11 Drawing Sheets

| | Parameter A | Parameter B |
|---|---|---|
| Face detection threshold value | High | Low |
| Face detection time | Long | Short |

INFORMATION PROCESSING APPARATUS AND CONTROL METHOD

CROSS-REFERENCE TO RELATED APPLICATIONS

This application claims priority to Japanese Patent Application No. 2022-109817 filed on Jul. 7, 2022, the contents of which are hereby incorporated herein by reference in their entirety.

BACKGROUND OF THE INVENTION

Field of the Invention

The present invention relates to an information processing apparatus and a control method.

Description of the Related Art

There is an apparatus which makes a transition to a usable operating state when a person approaches or to a standby state in which functions except some of the functions are stopped when the person leaves. For example, in Japanese Unexamined Patent Application Publication No. 2016-148895, there is disclosed a technique for detecting the intensity of infrared light using an infrared sensor to detect whether a person is approaching or a person has left in order to control the operating state of the apparatus.

In recent years, with the development of computer vision and the like, detection accuracy when detecting a face from an image has been getting higher. Therefore, face detection is beginning to be used instead of person detection using the infrared sensor. Infrared light is reflected back regardless of whether it is a person or an object other than the person when using the infrared sensor, but the use of face detection can suppress just an object from being detected as a person by mistake. For example, a PC (Personal Computer) or the like is equipped with a camera to capture an image for face detection described above in a position capable of capturing an image of the side where a user is present.

However, even in the case of using face detection, when the face deviates from an imaging range of the camera so that part of the face is not captured in the captured image, it may not be able to be detected as the face. In recent years, such a case that a user uses a PC while holding the PC in hand has been increasing, and in such a case, it is expected to make a face easy to deviate from the imaging range of a camera while the user is using the PC. Therefore, there is concern that the operating state is controlled as the absence of a user even though the user is present.

SUMMARY OF THE INVENTION

One or more embodiments of the present invention provide an information processing apparatus and a control method capable of improving robustness when controlling the operating state using face detection.

An information processing apparatus according to the first aspect of the present invention includes: a memory which temporarily stores a program of an OS (Operating System); a first processor which executes the program to implement functions of the OS; and a second processor which performs face detection processing to detect a face area with a face captured therein from an image captured by an imaging unit, wherein when the face area is no longer detected from a state where the face area is detected by the second processor, the first processor performs first processing to limit use of at least some of the functions of the OS in response to the fact that a state where the face area is not detected has lasted for a predetermined first time, and when it is detected that the information processing apparatus is held by a user before the first time elapses, the first processor disables the first processing, and performs second processing to limit the use of at least some of the functions of the OS in response to the fact that a state where there is no input by the user using the OS functions has lasted for a predetermined second time.

The above information processing apparatus may further include a sensor for detecting the movement of the information processing apparatus, wherein the first processor detects whether or not the information processing apparatus is held by the user based on the movement of the information processing apparatus detected by the sensor.

The above information processing apparatus may also be such that the first processor enables the first processing based on the fact that the face area is detected by the second processor before the second time elapses in the second processing, and when the face area is no longer detected again, the first processor limits the use of at least some of the functions of the OS in response to the fact that a state where the face area is not detected has lasted for the first time.

The above information processing apparatus may further be such that the first processor disables the second processing based on the fact that the face area is detected by the second processor before the second time elapses in the second processing.

Further, the above information processing apparatus may be such that the second processor changes detection conditions of the face area between when the first processing is executed and when the second processing is executed by the first processor.

Further, the above information processing apparatus may be such that the second processor detects, in the face area, an area in which a face-likeness evaluation value of the image processed by the face detection processing is a threshold value or more, and the threshold value when the second processing is executed is set to a value lower than the threshold value when the first processing is executed.

Further, the above information processing apparatus may be such that the second processor detects, as the face area, an area in which the evaluation value is the threshold value or more continuously for a predetermined third time from the captured image in the face detection processing, and the third time when the second processing is executed is set to a time shorter than the third time when the first processing is executed.

Further, the above information processing apparatus may be such that when at least some of the functions of the OS are limited by the second processing, the first processor enables the first processing, while when the face area is detected by the second processor again, the limitations on the OS functions limited by the second processing are released.

Further, the above information processing apparatus may be such that the first time is set shorter than the second time.

Further, a control method according to the second aspect of the present invention is a control method for an information processing apparatus including: a memory which temporarily stores a program of an OS (Operating System); a first processor which executes the program to implement functions of the OS; and a second processor which performs face detection processing to detect a face area with a face captured therein from an image captured by an imaging unit, the control method including: a step in which when the face area is no longer detected from a state where the face area is detected by the second processor, the first processor performs first processing to limit use of at least some of the functions of the OS in response to the fact that the state where the face area is not detected has lasted for a predetermined first time; and a step in which when it is detected that the information processing apparatus is held by a user before the first time elapses, the first processor disables the first processing, and performs second processing to limit use of at least some of the functions of the OS in response to the fact that a state where there is no input by the user using the functions of the OS has lasted for a predetermined second time.

The above-described aspects of the present invention can improve robustness when the information processing apparatus detects a user by face detection to control the operating state.

DETAILED DESCRIPTION OF THE INVENTION

One or more embodiments of the present invention will be described below with reference to the accompanying drawings.

Figure 1:
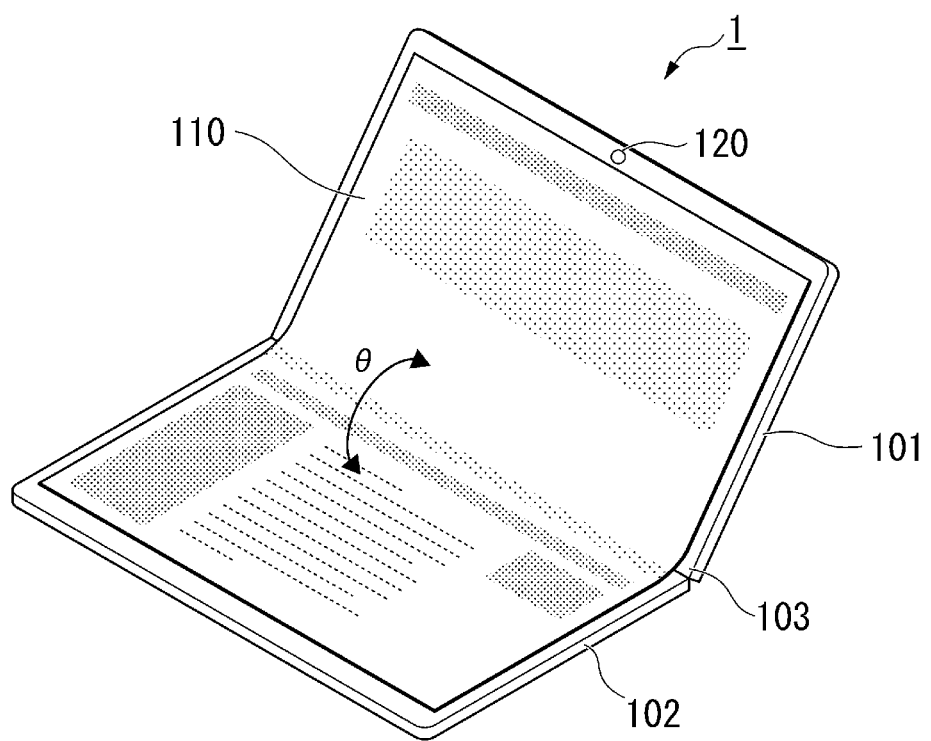
FIG. 1 is a perspective view illustrating a configuration example of the appearance of an information processing apparatus according to one or more embodiments.

FIG. 1 is a perspective view illustrating the appearance of an information processing apparatus 1 according to one or more embodiments. The information processing apparatus 1 according to the present invention is, for example, a clamshell PC (Personal Computer) equipped with a foldable display. The information processing apparatus 1 includes a first chassis 101, a second chassis 102, and a hinge mechanism 103. The first chassis 101 and the second chassis 102 are chassis having a substantially rectangular plate shape (for example, a flat plate shape). One of the sides of the first chassis 101 and one of the sides of the second chassis 102 are joined (coupled) through the hinge mechanism 103 in such a manner that the first chassis 101 and the second chassis 102 are rotatable relative to each other around the rotation axis of the hinge mechanism 103.

A state where an open angle θ between the first chassis 101 and the second chassis 102 around the rotation axis is substantially 0° is a state where the first chassis 101 and the second chassis 102 are closed in such a manner as to overlap each other (closed state). Surfaces of the first chassis 101 and the second chassis 102 on the sides to face each other in the closed state are called "inner surfaces," and surfaces on the other sides of the inner surfaces are called "outer surfaces," respectively. The open angle θ can also be called an angle between the inner surface of the first chassis 101 and the inner surface of the second chassis 102. As opposed to the closed state, a state where the first chassis 101 and the second chassis 102 are open is called an "open state." The open state is a state where the first chassis 101 and the second chassis 102 are rotated relative to each other until the open angle exceeds a preset threshold value (for example, 10°). The inner surface of the first chassis 101 and the inner surface of the second chassis 102 are flattened out when the open angle θ is 180°.

Further, the information processing apparatus 1 includes a display unit 110 and an imaging unit 120. The display unit 110 is provided from the inner surface of the first chassis 101 to the inner surface of the second chassis 102. The display unit 110 is a flexible display bendable (foldable) to fit the open angle θ by relative rotation of the first chassis 101 and the second chassis 102. As the flexible display, an organic EL display or the like is used. Further, for example, the display unit 110 is configured together with a touch panel to accept user's operation input to a display screen of the display unit 110.

For example, the information processing apparatus 1 can not only control the display of the entire screen area of the display unit 110 as one screen area (one-screen mode) but also control the display of two screen areas obtained by splitting the display into the two screen areas on the border of a crease when the entire screen area of the display unit 110 is folded by the relative rotation between the first chassis 101 and the second chassis 102 (two-screen mode).

The imaging unit 120 is provided in an outer part (peripheral area) of the screen area of the display unit 110 on the inner surface of the first chassis 101. Note that the position at which the imaging unit 120 illustrated in FIG. 1 is arranged is just an example, and it may be elsewhere as long as the imaging unit 120 can face a direction (frontward) to face the inner surface of the first chassis 101.

In the open state, the imaging unit 120 captures a predetermined imaging range in a direction (frontward) to face the inner surface of the first chassis 101. The predetermined imaging range is a range of angle of view defined by an image sensor included in the imaging unit 120 and an optical lens provided in front of an imaging surface of the image sensor. For example, the imaging unit 120 can capture an image including a person present in front of the information processing apparatus 1.

Based on the image captured by the imaging unit 120, the information processing apparatus 1 detects a person (that is, a user) present in the neighborhood of the information processing apparatus 1. This processing for detecting the presence of the person is called HPD (Human Presence Detection) processing. The information processing apparatus 1 detects the presence or absence of a person by the HPD processing to control the operating state of the system of the information processing apparatus 1 based on the detection result.

The information processing apparatus 1 can make a transition at least between a normal operating state (power-on state) and a standby state as system operating states. The normal operating state is an operating state capable of executing processing without being particularly limited, which corresponds, for example, to S0 state defined in the ACPI (Advanced Configuration and Power Interface) specification. The standby state is an operating state in which at least some of functions of the system are limited. For example, the standby state may be the standby state or a sleep state, or a state corresponding to modern standby in Windows (registered trademark) or S3 state (sleep state) defined in the ACPI specification. Further, a state in which at least the display of the display unit appears to be Off (screen OFF) or a screen lock state may also be included as the standby state. The screen lock is a state in which an image preset to make a processed content invisible (for example, an image for the screen lock) is displayed on the display unit, that is, an unusable state until the lock is released (for example, until the user is authenticated).

In the following, a transition of the system operating state from the standby state to the normal operating state may be called "boot." In the standby state, since the activation level is generally lower than the normal operating state, the boot of the system of the information processing apparatus 1 leads to the activation of the operation of the system in the information processing apparatus 1.

Figure 2A:
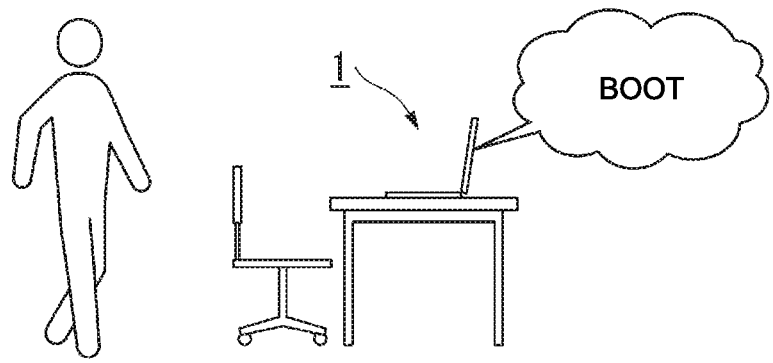
FIGS. 2A-2C are diagrams for describing an outline of HPD processing of the information processing apparatus according to one or more embodiments.
Figure 2B:
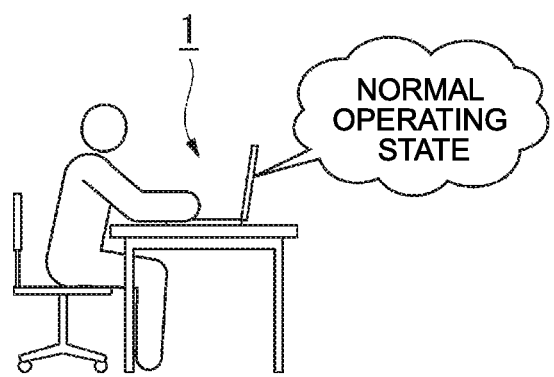
Figure 2C:
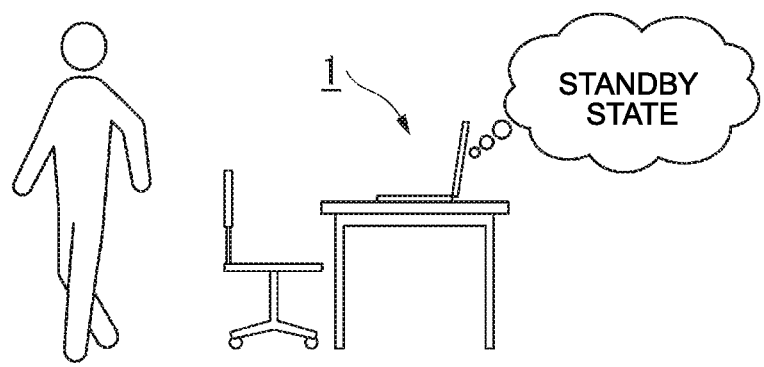

FIGS. 2A-2C are diagrams for describing an outline of HPD processing of the information processing apparatus 1 according to one or more embodiments. For example, as illustrated in FIG. 2A, when detecting a change from a state where no person is present in front of the information processing apparatus 1 (Absence) to a state where a person is present (Presence), that is, when detecting that a person approaches the information processing apparatus 1 (Approach), the information processing apparatus 1 determines that a user has approached and automatically boots the system to make a transition to the normal operating state. Further, in a state where a person is present in front of the information processing apparatus 1 (Presence) as illustrated in FIG. 2B, the information processing apparatus 1 determines that the user is present and continues the normal operating state. Then, as illustrated in FIG. 2C, when detecting a change from the state where the person is present in front of the information processing apparatus 1 (Presence) to the state where the person is no longer present (Absence), that is, when detecting that the person has left the information processing apparatus 1 (Leave), the information processing apparatus 1 determines that the user has left and causes the system to make a transition to the standby state.

Figure 3:
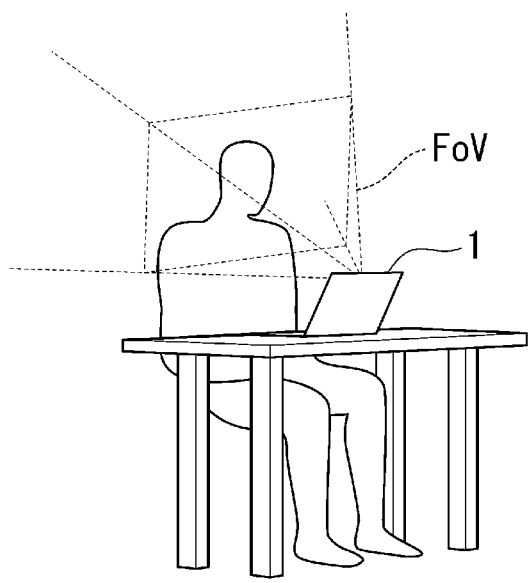
FIG. 3 is a diagram illustrating an example of a person detection range of the information processing apparatus according to one or more embodiments.

FIG. 3 is a diagram illustrating an example of a person detection range of the information processing apparatus 1 according to one or more embodiments. In the illustrated example, a detection range FoV (Field of View: detection viewing angle) in front of the information processing apparatus 1 is a person-detectable range. For example, the information processing apparatus 1 detects a face area with a face captured therein from a captured image captured forward by the imaging unit 120 to determine whether or not a person (user) is present in front of the information processing apparatus 1. The detection range FoV corresponds to an imaging angle of view at which the imaging unit 120 captures the image. Based on the fact that the face area is detected from the captured image, the information processing apparatus 1 determines that the user is present. On the other hand, based on the fact that no face area is detected from the captured image, the information processing apparatus 1 determines that the user is not present.

Here, when the face deviates from the detection range FoV, the face area may not be detected from the captured image even though the user is present in front of the information processing apparatus 1.

Figure 4B:
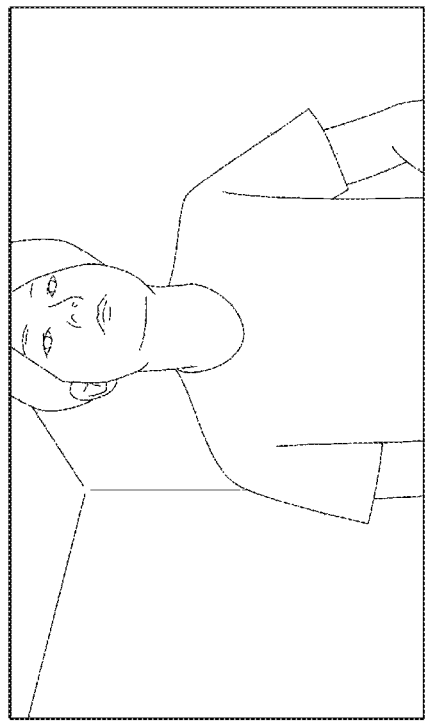
FIGS. 4A-4B are diagrams illustrating a detection example of a face area according to one or more embodiments.
Figure 4A:
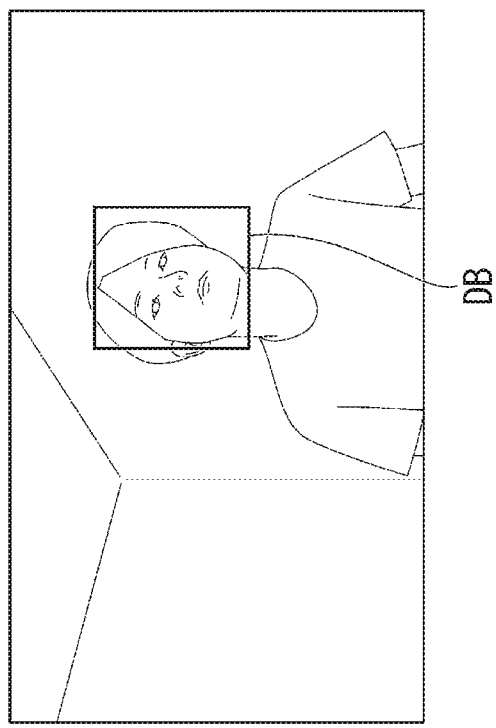

FIGS. 4A-4B are diagrams illustrating a detection example of a face area according to one or more embodiments. FIG. 4A illustrates an example of a state in which the face area is detected from a captured image because the whole face of a user falls within the detection range FoV. A face detection frame DB is displayed corresponding to the face area detected from the captured image. On the other hand, FIG. 4B illustrates an example of a state in which the face area cannot be detected from the captured image because the face of the user deviates from the detection range FoV in such a manner that part of the face of the user is out of the detection range FoV.

For example, the posture or position of the user changes, the face of the user may deviate from the detection range FoV and hence the face area may not be able to be detected from the captured image. Alternatively, when the open angle θ between the first chassis 101 and the second chassis 102 changes, the face of the user may also deviate from the detection range FoV and hence the face area may not be able to be detected from the captured image. Further, even when the user is using the information processing apparatus 1 while holding it in hand, since the posture of the information processing apparatus 1 is difficult to maintain, it is easier for the face of the user to deviate from the detection range FoV than when the user is using the information processing apparatus 1 placed on a desk, and hence the face area may not be able to be detected from the captured image. For example, since the information processing apparatus 1 equipped with the foldable display unit 110 like in one or more embodiments has the display screen from the inner surface of the first chassis 101 to the inner surface of the second chassis 102, there are more cases of being used in hand than general laptop PCs with a keyboard thereon.

Thus, the face area may not be detected from the captured image even though the user is present in front of the information processing apparatus 1. In this case, the information processing apparatus 1 may falsely determine that the user has left even though the user is present in front of the information processing apparatus 1, and hence the transition to the standby state may be made.

Figure 5:
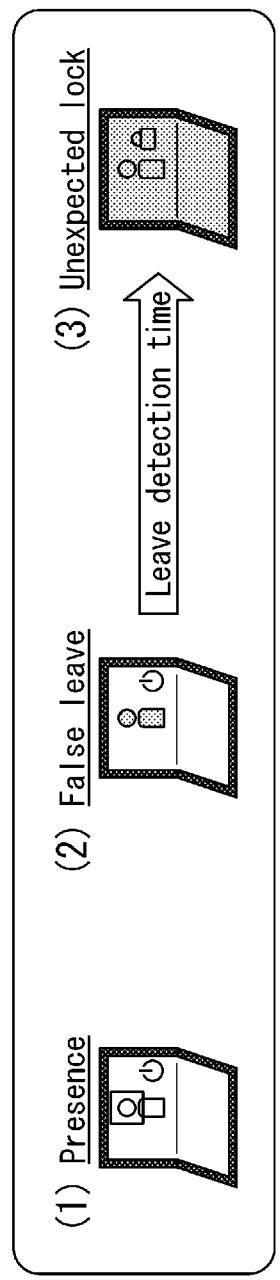
FIG. 5 is a diagram illustrating an example of transitions of an operating state when it is determined that a user has left according to one or more embodiments.

FIG. 5 is a diagram illustrating an example of transitions of the operating state when the leave of the user is determined. (1), (2), and (3) in FIG. 5 illustrate transitions of the operating state of the information processing apparatus 1, respectively.

(1) In the state where the face area is detected from the captured image as illustrated in FIG. 4A, the information processing apparatus 1 determines that the user is present in front of the information processing apparatus 1, which is in the normal operating state.

(2) When the face area can no longer be detected from the captured image because the face of the user deviates from the detection range FoV as illustrated in FIG. 4B, the information processing apparatus 1 determines the leave of the user (false determination). For example, when the state where the face area cannot be detected has lasted for a predetermined time after the face area could no longer be detected from the captured image, the information processing apparatus 1 determines that the user has left. The predetermined time until this leave determination is called "leave detection time" below. For example, the leave detection time is set to 30 seconds or the like. Note that the leave detection time may also be able to be set by the user.

(3) When determining that the user has left, the information processing apparatus 1 will make the transition from the normal operating state to the standby state (for example, lock state) by HPD processing even if this determination is false. In other words, even when the user is using the information processing apparatus 1, the information processing apparatus 1 makes the transition to the standby state (for example, lock state), and becomes the standby state (for example, lock state) that is not expected.

Therefore, in one or more embodiments, when there is user input before the leave detection time elapses, the information processing apparatus 1 determines that the user does not leave even though the face area cannot be detected from the captured image, and continues the normal operating state without making the transition to the standby state. Here, the user input is, for example, user operation input to the touch panel provided on the display screen of the display unit 110. Note that when input devices such as an external keyboard and/or an external touch pad are connected to the information processing apparatus 1, the user operation input may also be user operation input to these input devices. In the following, input on an HID (Human Interface Device) such as the touch panel, the keyboard, or the touch pad is called "HID input."

Further, when it is detected that the information processing apparatus 1 is held by the user before the leave detection time elapses, the information processing apparatus 1 determines that the user does not leave even though the face area cannot be detected from the captured image, and continues the normal operating state without making the transition to the standby state. In the following, a state where the information processing apparatus 1 is held by the user is called a "held state."

Figure 6:
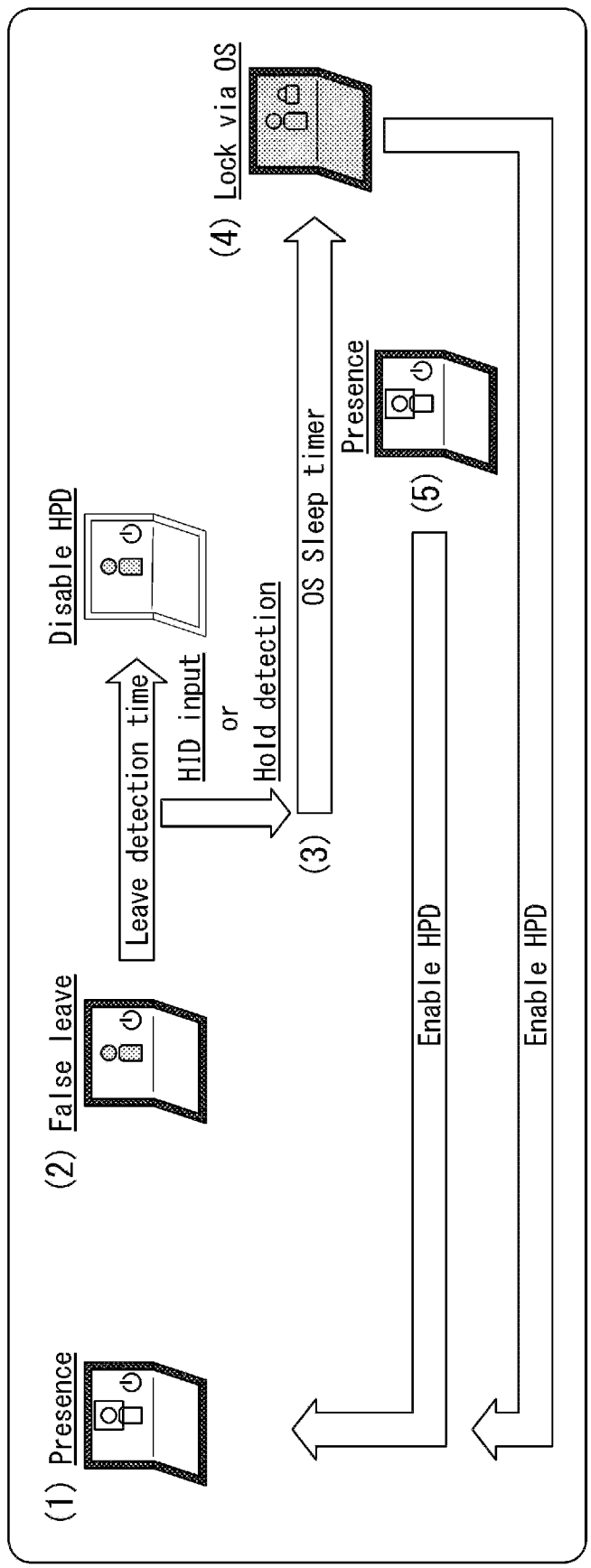
FIG. 6 is a diagram illustrating the outline of transitions of the operating state of the information processing apparatus according to one or more embodiments.

FIG. 6 is a diagram illustrating the outline of transitions of the operating state of the information processing apparatus 1 according to one or more embodiments. (1) to (5) in FIG. 6 illustrate transitions of the operating state of the information processing apparatus 1, respectively.

(1) In the state where the face area is detected from the captured image as illustrated in FIG. 4A, the information processing apparatus 1 determines the state where the user is present in front of the information processing apparatus 1 (Presence), which is the normal operating state.

(2) When the face area can no longer be detected from the captured image because the face of the user deviates from the detection range FoV as illustrated in FIG. 4B, the information processing apparatus 1 counts the leave detection time until the determination that the user has left.

(3) When there is HID input or the held state is detected before the leave detection time elapses, the information processing apparatus 1 starts counting of a sleep timer by an OS (Operating System) without making the transition to the standby state by HPD processing. The sleep timer is a timer to count the time during which there is no HID input. When a predetermined time counted by the sleep timer has passed, the information processing apparatus 1 makes the transition to the standby state. The predetermined time counted by this sleep timer is the time preset on the OS or set by the user, which is called "sleep setting time" below. For example, the sleep setting time is set to one minute, five minutes, 10 minutes, 30 minutes, or the like. Note that the leave detection time is set shorter than the sleep setting time.

(4) When the state where there is no HID input has lasted for the sleep setting time, the information processing apparatus 1 makes the transition from the normal operating state to the standby state (for example, lock state) by OS processing. In other words, when there is HID input before the leave detection time elapses, the information processing apparatus 1 disables processing to control the operating state by the HPD processing (hereinafter called "HPD control processing"), and enables processing to control the operating state according to the presence or absence of HID input (hereinafter called "HID control processing"). Further, when the transition to the standby state (for example, lock state) is made by the HID control processing, the information processing apparatus 1 turns the HPD control processing back to enabled. Thus, the information processing apparatus 1 performs boot processing by the HPD control processing to make the transition to the normal operating state when the approach of the user (Approach) is detected, where the state becomes the state where the user is present in front of the information processing apparatus 1 (Presence) illustrated at (1).

(5) Further, when the face area is detected from the captured image before the sleep setting time elapses after the start of counting of the sleep timer in the HID control processing, since the user is present in front of the information processing apparatus 1 (Presence), the information processing apparatus 1 disables the HID control processing and turns the HPD control processing back to enabled. In other words, the information processing apparatus 1 returns to the state illustrated at (1).

Thus, even in a case where the face area is no longer detected from the captured image in the normal operating state, when there is HID input, the information processing apparatus 1 determines that the user is using the information processing apparatus 1, and does not make the transition to the standby state. After that, when the state where there is no HID input has lasted for the sleep setting time, the information processing apparatus 1 can determine that the user has really left and make the transition to the standby state.

Further, even in the case where the face area is no longer detected from the captured image in the normal operating state, when it is detected that the information processing apparatus 1 is in the held state, the information processing apparatus 1 determines that the user is using the information processing apparatus 1, and does not make the transition to the standby state. After that, when the state where there is no HID input has lasted for the sleep setting time, the information processing apparatus 1 can determine that the user has really left and make the transition to the standby state.

Thus, the information processing apparatus 1 can detect the user by face detection and improve robustness when controlling the operating state.

[Hardware Configuration of Information Processing Apparatus]

Figure 7:
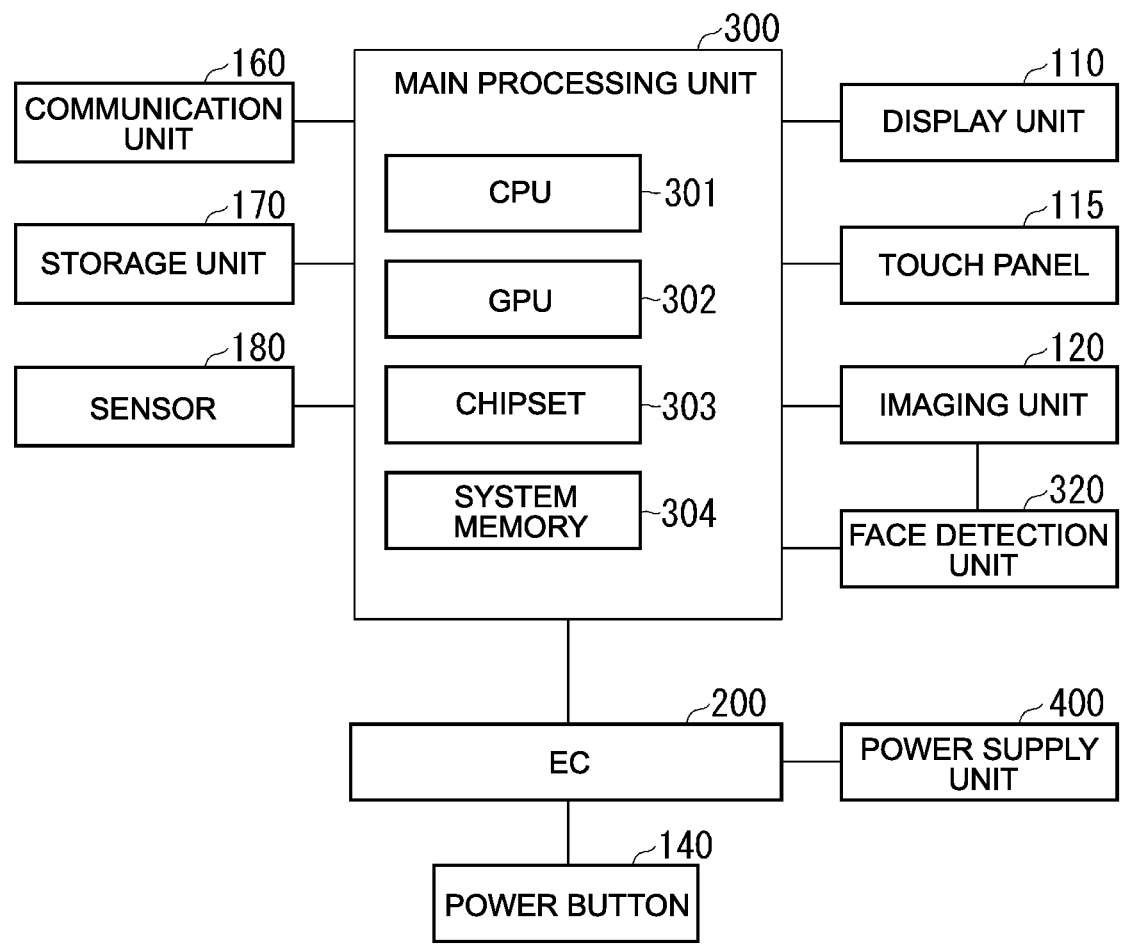
FIG. 7 is a schematic block diagram illustrating an example of the hardware configuration of the information processing apparatus according to one or more embodiments.

FIG. 7 is a schematic block diagram illustrating an example of the hardware configuration of the information processing apparatus 1 according to one or more embodiments. In FIG. 7, components corresponding to respective units in FIG. 1 are given the same reference numerals. The information processing apparatus 1 is configured to include the display unit 110, a touch panel 115, the imaging unit 120, a power button 140, a communication unit 160, a storage unit 170, a sensor 180, an EC (Embedded Controller) 200, a main processing unit 300, a face detection unit 320, and a power supply unit 400.

The display unit 110 displays display data (images) generated based on system processing executed by the main processing unit 300, processing of an application program running on the system processing, and the like. As described with reference to FIG. 1, the display unit 110 is the flexible display bendable (foldable) to fit the open angle θ by relative rotation of the first chassis 101 and the second chassis 102.

The touch panel 115 is provided on the display screen of the display unit 110 to output operation signals based on user's touch operations. For example, the touch panel 115 can be any touch panel such as capacitance-type or resistive-film type.

The imaging unit 120 captures an image of an object within the predetermined imaging range (angle of view) in the direction (frontward) to face the inner surface of the first chassis 101, and outputs the captured image to the main processing unit 300 and the face detection unit 320. For example, the imaging unit 120 is a visible light camera (RGB camera) to capture an image using visible light. Note that the imaging unit 120 may also include an infrared camera (IR camera) to capture an image using infrared light, or may be a hybrid camera capable of capturing images using visible light and infrared light. The power button 140 outputs, to the EC 200, an operation signal according to a user's operation.

The communication unit 160 is connected to other devices communicably through a wireless or wired communication network to transmit and receive various data. For example, the communication unit 160 is configured to include a wired LAN interface such as Ethernet (registered trademark), a wireless LAN interface such as Wi-Fi (registered trademark), and the like.

The storage unit 170 is configured to include storage media, such as an HDD (Hard Disk Drive) or an SDD (Solid State Drive), a RAM, and a ROM. The storage unit 170 stores the OS, device drivers, various programs such as applications, and various data acquired by the operation of the programs.

The sensor 180 is a sensor for detecting the movement, orientation, and the like of the information processing apparatus 10. For example, the sensor 180 is configured to include an acceleration sensor. Note that the sensor 180 may also be configured to include an angular velocity sensor instead of or in addition to the acceleration sensor.

The power supply unit 400 supplies power to each unit according to the operating state of each unit of the information processing apparatus 1. The power supply unit 400 includes a DC (Direct Current)/DC converter. The DC/DC converter converts the voltage of DC power, supplied from an AC (Alternate Current)/DC adapter or a battery (battery pack) to a voltage required for each unit. The power with the voltage converted by the DC/DC converter is supplied to each unit through each power system. For example, the power supply unit 400 supplies power to each unit through each power system based on a control signal input from the EC 200.

The EC 200 is a microcomputer configured to include a CPU (Central Processing Unit), a RAM (Random Access Memory), a ROM (Read Only Memory), an I/O (Input/Output) logic circuit, and the like. The CPU of the EC 200 reads a control program (firmware) prestored in the own ROM, and executes the read control program to fulfill the function. The EC 200 operates independently of the main system processing unit 300 to control the operation of the main processing unit 300 and manage the operating state of the main processing unit 300. Further, the EC 200 is connected to the power button 140, the power supply unit 400, and the like.

For example, the EC 200 communicates with the power supply unit 400 to acquire information on a battery state (remaining battery capacity, and the like) from the power supply unit 400 and to output, to the power supply unit 400, a control signal or the like in order to control the supply of power according to the operating state of each unit of the information processing apparatus 1. Further, the EC 200 acquires operation signals from the power button 140 and the input device 150, and outputs, to the main processing unit 300, an operation signal related to processing of the main processing unit 300 among the acquired operation signals.

The main processing unit 300 is configured to include a CPU (Central Processing Unit) 301, a GPU (Graphic Processing Unit) 302, a chipset 303, and a system memory 304, where processing of various application programs is executable on the OS (Operating System) by system processing based on the OS.

The CPU 301 executes processing based on a BIOS program, processing based on the OS program, processing based on application programs running on the OS, and the like. The CPU 301 controls the operating state of the system under the control of the chipset 303. For example, the CPU 301 executes boot processing to cause the operating state of the system to make the transition from the standby state to the normal operating state. Further, the CPU 301 executes processing to cause the operating state of the system to make the transition from the normal operating state to the standby state. For example, the CPU 301 executes HID control processing to make the transition from the normal operating state to the standby state (for example, lock state) by OS processing when the state of no HID input has lasted for the sleep setting time.

The GPU 302 is connected to the display unit 110. The GPU 302 executes image processing under the control of the CPU 301 to generate display data. The GPU 302 outputs the generated display data to the display unit 110.

The chipset 303 has a function as a memory controller, a function as an I/O controller, and the like. For example, the chipset 303 controls reading data from and writing data to the system memory 304, the storage unit 170, and the like by the CPU 301 and the GPU 302. Further, the chipset 303 controls input/output of data from the communication unit 160, the display unit 110, and the EC 200.

Further, the chipset 303 has a function as a sensor hub. For example, the chipset 303 acquires the detection result by the face detection processing acquired from the face detection unit 320, and the like. For example, based on information acquired from the face detection unit 320, the chipset 303 executes HPD processing to detect a person (user), and HPD control processing to control the operating state of the system based on the person detection result. Further, the chipset 303 acquires the output of the sensor 180. For example, based on the output of the sensor 180, the chipset 303 detects the movement, shaking, and the like of the information processing apparatus 1 to detect whether or not the information processing apparatus 1 is in the held state based on the detection result.

The system memory 304 is used as a reading area of a program executed by the CPU 301 and a working area to write processed data. Further, the system memory 304 temporarily stores image data of a captured image captured by the imaging unit 120.

Note that the CPU 301, the GPU 302, and the chipset 303 may also be integrated as one processor, or some or all of them may be configured as individual processors. For example, in the normal operating state, the CPU 301, the GPU 302, and the chipset 303 are all operating, but in the standby state, only at least some of the functions of the chipset 303 are operating. In the standby state, at least only functions required for HPD processing upon booting are working.

The face detection unit 320 is configured to include a processor for processing image data of a captured image captured by the imaging unit 120. The face detection unit 320 acquires the image data of the captured image captured by the imaging unit 120, and temporarily stores the acquired image data in a memory. The memory in which the image data is stored may be the system memory 304, or a memory connected to the above processor included in the face detection unit 320.

For example, the face detection unit 320 processes the image data of the captured image acquired from the imaging unit 120 to execute face detection processing for detecting a face area from the captured image, and the like. The face detection unit 320 transmits, to the chipset 303 of the main processing unit 300, the detection result by the face detection processing.

[Functional Configuration of Information Processing Apparatus]

Next, a functional configuration related to HPD control processing and HID control processing in the information processing apparatus 1 will be described in detail.

Figure 8:
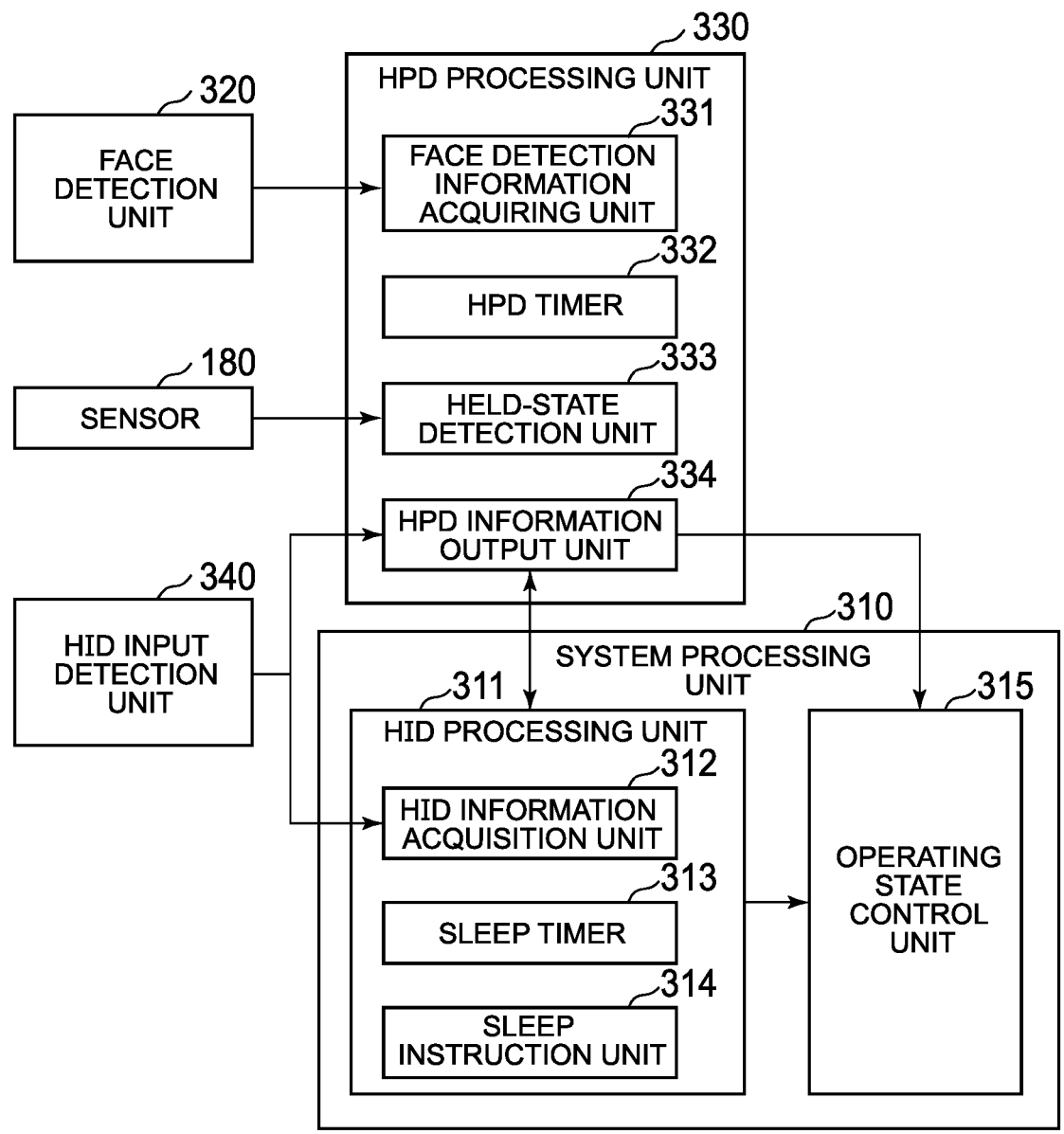
FIG. 8 is a schematic block diagram illustrating an example of the functional configuration of the information processing apparatus according to one or more embodiments.

FIG. 8 is a schematic block diagram illustrating an example of the functional configuration of the information processing apparatus 1 according to one or more embodiments. The information processing apparatus 1 includes a system processing unit 310, the face detection unit 320, an HPD processing unit 330, an HID input detection unit 340.

The HID input detection unit 340 is, for example, a functional component implemented by the chipset 303 illustrated in FIG. 7, which detects the presence or absence of HID input based on operation signals from the touch panel 115 and the like. When there is HID input, the HID input detection unit 340 outputs, to the system processing unit 310 and the HPD processing unit 330, HDI input information indicating that there is HID input.

Further, when input devices such as an external keyboard and/or an external touch pad are connected to the information processing apparatus 1, the HID input detection unit 340 may detect the presence or absence of HID input based on operation signals from these input devices. Further, the HID input detection unit 340 may be, for example, a functional component of the EC 200 illustrate in FIG. 7.

The HPD processing unit 330 is a functional component to execute the HPD processing by processing of the chipset 303. For example, the HPD processing unit 330 includes a face detection information acquiring unit 331, an HPD timer 332, a held state detection unit 333, and an HPD information output unit 334 to execute HPD control processing.

The face detection information acquiring unit 331 acquires, from the face detection unit 320, face detection information indicating whether or not a face area is detected from a captured image. The HPD timer 332 counts, for example, the leave detection time described above.

Based on the output of the sensor 180 (that is, the movement of the information processing apparatus 1), the held state detection unit 333 detects whether or not the information processing apparatus 1 is in the held state (that is, whether or not the information processing apparatus 1 is held by the user). For example, when the information processing apparatus 1 is placed on the desk, the information processing apparatus 1 stands still, while when the information processing apparatus 1 is held by the user, shaking occurs. When the movement (shaking) of the information processing apparatus 1 detected by the sensor 180 is a predetermined threshold value or more, the held state detection unit 333 determines that the information processing apparatus 1 is in the held state. On the other hand, when the movement (shaking) of the information processing apparatus 1 detected by the sensor 180 is less than the threshold value, the held state detection unit 333 determines that the information processing apparatus 1 is not in the held state.

More specifically, even when there is movement (shaking) of the information processing apparatus 1, the information processing apparatus 1 may be in a vehicle, rather than being held by the user. Therefore, when the accumulated speed of the movement (shaking) of the information processing apparatus 1 detected by the sensor 180 is a predetermined value (for example, 4 km per hour) or more, the held state detection unit 333 may determine that the information processing apparatus 1 is in a vehicle because of being faster than a walking speed to determine that the information processing apparatus 1 is not in the held state even when the movement (shaking) of the information processing apparatus 1 is the predetermined threshold value or more. Further, the movement (shaking) of the information processing apparatus 1 held by the user is relatively slow. Therefore, when the frequency component of the movement (shaking) of the information processing apparatus 1 detected by the sensor 180 is a predetermined value (for example, 2 Hz) or more, the held state detection unit 333 may also determine that the information processing apparatus 1 is in the vehicle to determine that the information processing apparatus 1 is not in the held state even when the movement (shaking) of the information processing apparatus 1 is the predetermined threshold value or more.

Further, even when the amount of movement (shaking) of the information processing apparatus 1 accumulated per unit time and detected by the sensor 180 is a predetermined value or more, the held state detection unit 333 may determine that the information processing apparatus 1 is not in the held state as a result of the transportation by the vehicle or the like.

When determining that the information processing apparatus 1 is in the held state, the held state detection unit 333 outputs, to the HPD processing unit 330, held state information indicative of the held state.

Based on the face detection information acquired by the face detection information acquiring unit 331, the HPD information output unit 334 detects the approach of the user to the information processing apparatus 1 (Approach), the presence of the user in front of the information processing apparatus 1 (Presence), the absence of the user in front of the information processing apparatus 1 (Absence), or the leave of the user from the information processing apparatus 1 (Leave), and outputs information based on the detection result.

Based on the face detection information acquired by the face detection information acquiring unit 331, the HPD information output unit 334 detects the approach of the user to the information processing apparatus 1 (Approach) when the face area is detected from the state where the face area is not detected from the captured image. For example, when the approach of the user to the information processing apparatus 1 (Approach) is detected in the standby state, the HPD information output unit 334 outputs, to the system processing unit 310, instruction information to instruct the system processing unit 310 to boot the system.

Further, based on the face detection information acquired by the face detection information acquiring unit 331, the HPD information output unit 334 detects the state where the user is present in front of the information processing apparatus 1 (Presence) while the state where the face area is detected from the captured image lasts. For example, the HPD information output unit 334 outputs, to the system processing unit 310, setting information to disable the HID control processing while detecting the state where the user is present in front of the information processing apparatus 1 (Presence) in the normal operating state.

Further, based on the face detection information acquired by the face detection information acquiring unit 331, the HPD information output unit 334 starts counting the leave detection time using the HPD timer 332 when the face area is no longer detected from the state where the face area is detected from the captured image. When the state where the face area is not detected (the state where the user is not present in front of the information processing apparatus 1 (Absence)) has lasted for the leave detection time, the HPD information output unit 334 detects the leave of the user from the information processing apparatus 1 (Leave). When the leave of the user from the information processing apparatus 1 (Leave) is detected in the normal operating state, the HPD information output unit 334 outputs, to the system processing unit 310, instruction information to cause the system to make the transition to the standby state.

Further, when the HID input information indicating that there is HID input is acquired from the HID input detection unit 340 before the leave detection time elapses after the state where no face area is detected (the state where the user is not present in front of the information processing apparatus 1 (Absence)), the HPD information output unit 334 stops counting of the HPD timer 332, and disables the HPD control processing. Then, the HPD information output unit 334 outputs, to the system processing unit 310, setting information to enable the HID control processing.

Similarly, even when the held state information indicative of the held state is acquired from the held state detection unit 333 before the leave detection time elapses after the state where no face area is detected (the state where the user is not present in front of the information processing apparatus 1 (Absence)), the HPD information output unit 334 stops counting of the HPD timer 332 and disables the HPD control processing. Then, the HPD information output unit 334 outputs, to the system processing unit 310, the setting information to enable the HID control processing.

The system processing unit 310 is a functional component implemented by the CPU 301 executing processing of the BIOS and the OS. For example, the system processing unit 310 includes an HID processing unit 311 and an operating state control unit 315 as functional components by the OS processing.

The HID processing unit 311 includes an HID information acquisition unit 312, a sleep timer 313, and a sleep instruction unit 314 to execute the HID control processing.

The HID information acquisition unit 312 acquires, from the HID input detection unit 340, HID input information indicating that there was HID input. The sleep timer 313 counts the sleep setting time. The HID information acquisition unit 312 resets the sleep timer 313 each time the HDI input information indicating that there was HID input is acquired from the HID input detection unit 340. In other words, the sleep timer 313 counts a duration during which there is no HID input. When the count of the sleep timer 313 reaches the sleep setting time, the sleep instruction unit 314 outputs, to the operating state control unit 315, instruction information to cause the system to make the transition to the standby state.

Note that when acquiring, from the HPD information output unit 334, the setting information to enable HID control processing, the HID processing unit 311 enables this HID control processing, and when the count of the sleep timer 313 reaches the sleep setting time, the instruction information to cause the system to make the transition to the standby state is output to the operating state control unit 315.

On the other hand, when acquiring the setting information to disable the HID control processing from the HPD information output unit 334 before the count of the sleep timer 313 reaches the sleep setting time, the HID processing unit 311 disables this HID control processing. When disabling the HID control processing, the HID processing unit 311 may perform control to stop counting of the sleep timer 313, or may perform control not to output the instruction information to cause the system to make the transition to the standby state even when the count of the sleep timer 313 reaches the sleep setting time.

The operating state control unit 315 controls the operating state of the system. For example, the operating state control unit 315 controls the operating state of the system to the normal operating state, the standby state, or the like under the control of the HPD processing unit 330. As an example, when acquiring the instruction information to give an instruction to boot the system from the HPD processing unit 330, the operating state control unit 315 executes the boot processing to cause the operating state of the system to make the transition from the standby state to the normal operating state. Further, when acquiring, from the HPD processing unit 330, an instruction to cause the operating state of the system to make the transition to the standby state, the operating state control unit 315 causes the operating state of the system to make the transition from the normal operating state to the standby state.

[Operation of Boot Processing]

Figure 9:
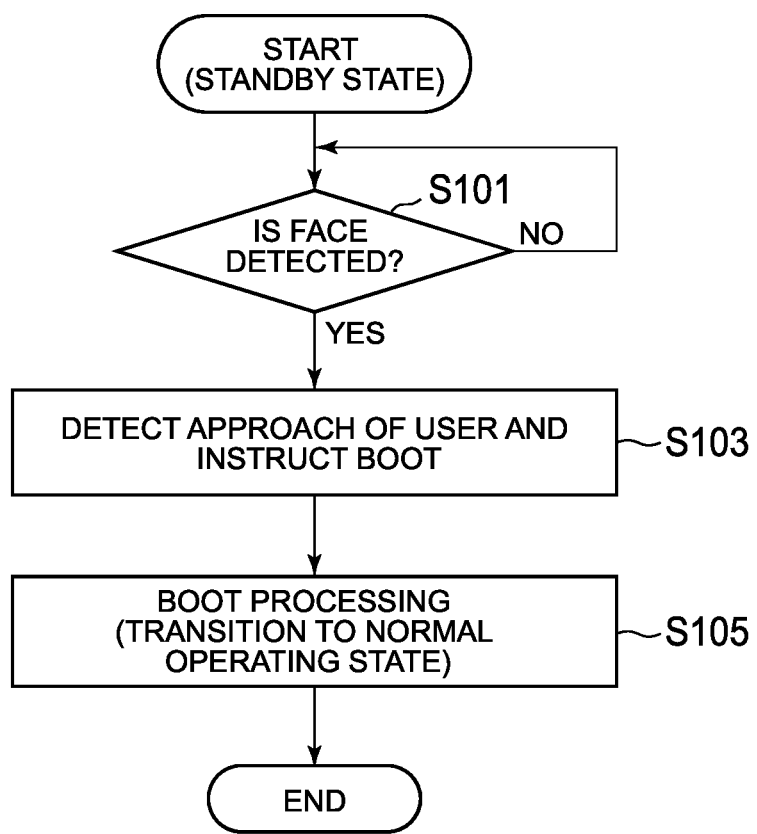
FIG. 9 is a flowchart illustrating an example of boot processing according to one or more embodiments.

Referring next to FIG. 9, the operation of the boot processing to cause the information processing apparatus 1 to make the transition from the standby state to the normal operating state by the HPD control processing will be described.

FIG. 9 is a flowchart illustrating an example of the boot processing according to one or more embodiments. Here, it is assumed that information processing apparatus 1 is in the standby state, and placed on a desk or the like in the open state.

(Step S101) The HPD processing unit 330 determines whether or not a face area is detected from a captured image based on face detection information acquired from the face detection unit 320. When determining that no face area is detected (NO), the HPD processing unit 330 performs the process in step S101 again. On the other hand, when determining that the face area is detected (YES), the HPD processing unit 330 proceeds to a process in step S103.

(Step S103) In response to the fact that the face area is detected, the HPD processing unit 330 detects the approach of the user to the information processing apparatus 1 (Approach), and outputs, to the system processing unit 310, instruction information to give an instruction to boot the system. Then, the procedure proceeds to a process in step S105.

(Step S105) When acquiring the instruction information to give the instruction to boot the system, the system processing unit 310 executes the boot processing to cause the operating state of the system to make the transition from the standby state to the normal operating state.

[Operation of Operating State Control Processing After Booting]

Figure 10:
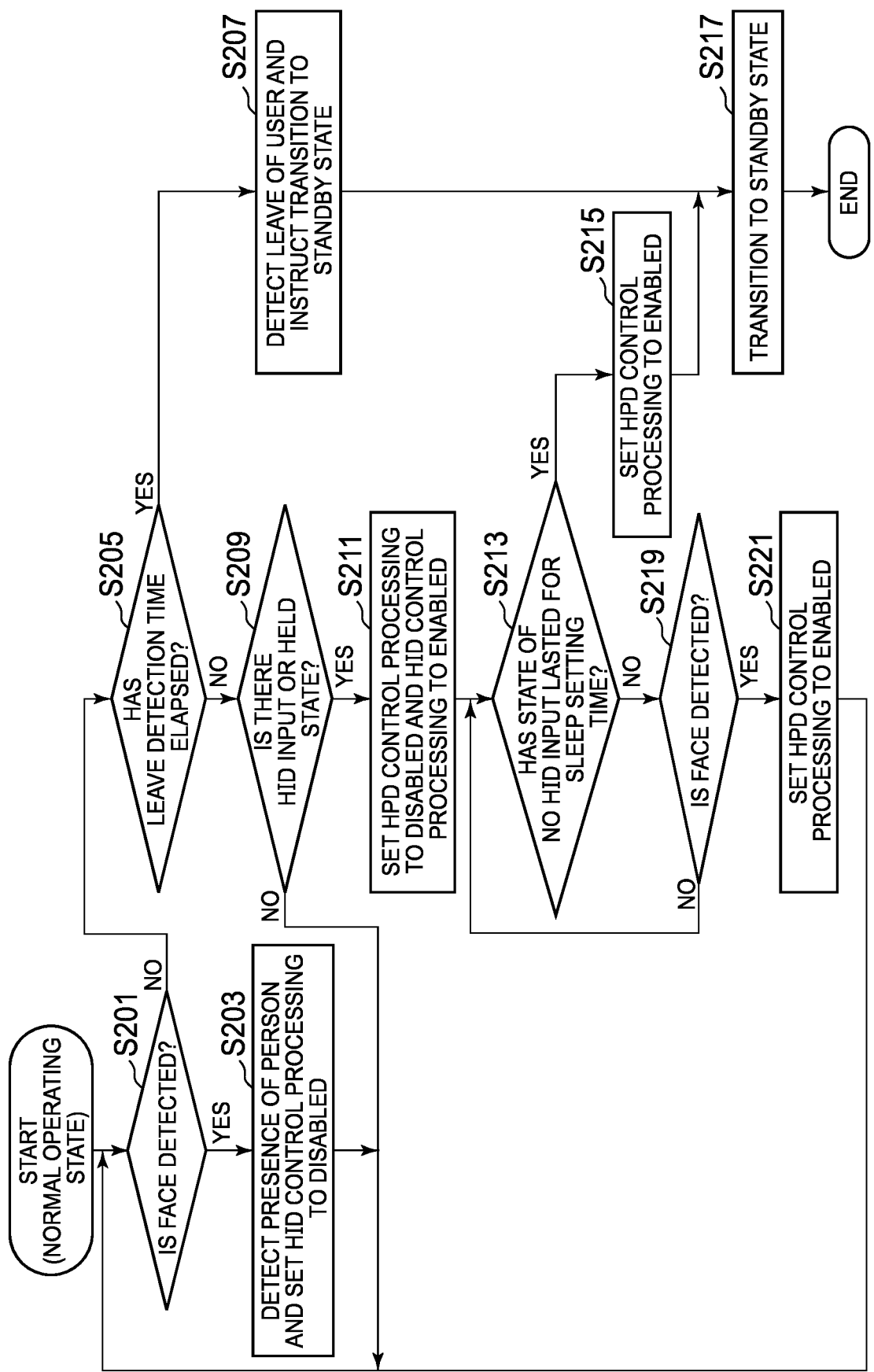
FIG. 10 is a flowchart illustrating an example of operating state control processing after booting according to one or more embodiments.

Referring next to FIG. 10, the operation of operating state control processing by the HPD control processing and the HID control processing after booting will be described.

FIG. 10 is a flowchart illustrating an example of operating state control processing after booting according to one or more embodiment.

(Step S201) The HPD processing unit 330 determines whether or not the face area is detected from the captured image based on the face detection information acquired from the face detection unit 320. When determining that the face area is detected (YES), the HPD processing unit 330 proceeds to a process in step S203. On the other hand, when determining that the face area is not detected (NO), the HPD processing unit 330 proceeds to a process in step S205.

(Step S203) When determining in step S201 that the face area is detected, the HPD processing unit 330 detects the state where the user is present in front of the information processing apparatus 1 (Presence), and outputs, to the system processing unit 310, setting information to disable the HID control processing. Thus, the system processing unit 310 sets the HID control processing to disabled. Then, the procedure returns to the process in step S201.

(Step S205) When determining in step S201 that the face area is not detected, the HPD processing unit 330 determines whether or not the leave detection time has elapsed from the state where the face area was no longer detected. When determining that the leave detection time has elapsed (YES), the HPD processing unit 330 proceeds to a process in step S207. On the other hand, when determining that the leave detection time has not elapsed yet (NO), the HPD processing unit 330 proceeds to a process in step S209.

(Step S207) When determining in step S205 that the leave detection time has elapsed from the state where the face area was no longer detected, the HPD processing unit 330 detects that the user has left from the information processing apparatus 1 (Leave), and outputs, to the system processing unit 310, instruction information to cause the system to make the transition to the standby state. When acquiring, from the HPD processing unit 330, the instruction information to make the transition to the standby state, the system processing unit 310 causes the operating state of the system to make the transition from the normal operating state to the standby state (step S217).

(Step S209) When determining in step S205 that the leave detection time has not elapsed yet, the HPD processing unit 330 determines whether or not HID input information indicating that there was HID input or held state information indicative of the held state is acquired. When determining that both the HID input information and the held state information are not acquired (NO), the HPD processing unit 330 returns to the process in step S201. On the other hand, when determining that the HDI input information or the held state information is acquired (YES), the HPD processing unit 330 proceeds to a process in step S211.

(Step S211) When determining in step S209 that the HID input information is acquired, the HPD processing unit 330 disables the HPD control processing. Further, the HPD processing unit 330 outputs, to the system processing unit 310, setting information to set the HID control processing to enabled. Thus, the system processing unit 310 sets the HID control processing to enabled. Then, the system processing unit 310 proceeds to a process in step S213.

(Step S213) When setting the HID control processing to enabled in step S211, the system processing unit 310 determines whether or not the state where there is no HID input has lasted for the sleep setting time. When determining that the state where there is no HID input has lasted for the sleep setting time (YES), the system processing unit 310 proceeds to a process in step S215. On the other hand, when determining that the state where there is no HID input has not lasted for the sleep setting time (NO), the system processing unit 310 proceeds to a process in step S219.

(Step S215) When determining in step S213 that the state where there is no HID input has lasted for the sleep setting time, the system processing unit 310 outputs, to the HPD processing unit 330, setting information to enable the HPD control processing. Then, the procedure proceeds to a process in step S217 in which the system processing unit 310 causes the operating state of the system to make the transition from the normal operating state to the standby state.

(Step S219) When determining in step S213 that the state where there is no HID input has not lasted for the sleep setting time, the HPD processing unit 330 determines whether or not the face area is detected from the captured image based on the face detection information acquired from the face detection unit 320. When determining that the face area is not detected (NO), the HPD processing unit 330 returns to the process in step S213. On the other hand, when determining that the face area is detected (YES), the HPD processing unit 330 proceeds to a process in step S221.

(Step S221) When determining in step S219 that the face area is detected, the HPD processing unit 330 sets the HPD control processing to enabled, and returns to the process in step S201.

[Face Detection Parameters]

Note that detection conditions for which the face detection unit 320 detects a face area from a captured image (hereinafter called "face detection conditions") may be changed between when the HPD control processing for controlling the operating state by the HPD processing is executed, and when the HID control processing for controlling the operating state based on the presence of absence of HID input is executed.

For example, when the held state is detected before the leave detection time elapses, the HPD control processing is disabled and the HID control processing is executed. However, since the user is likely not to leave at this time, a face detection condition easier to detect a face area than usual (than the HPD control processing) is set.

Figures 11, 12:
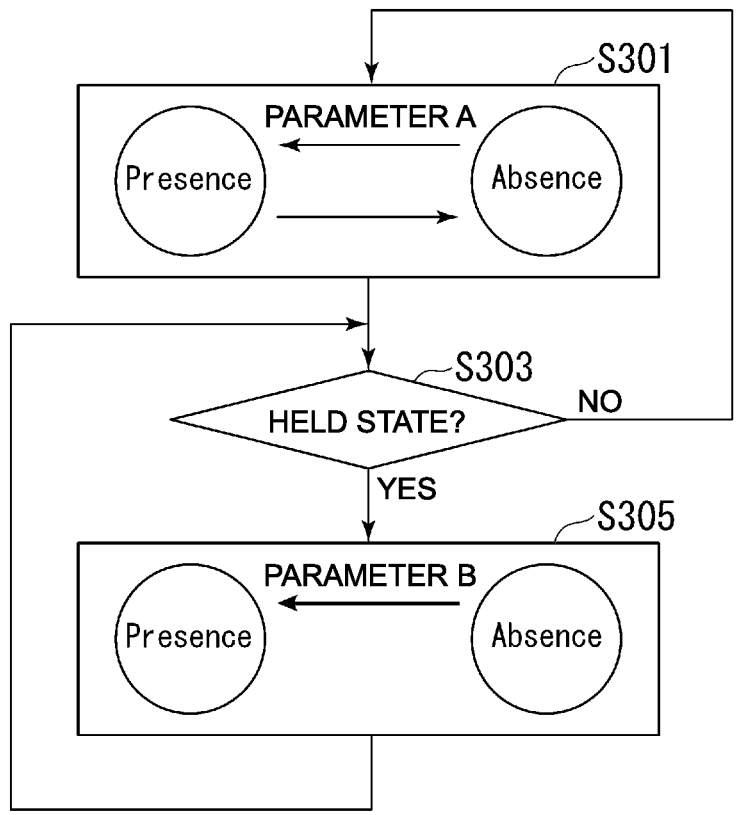
FIG. 11 is a flowchart illustrating a control example of face detection conditions according to one or more embodiments.
FIG. 12 is a table illustrating an example of parameters of face detection conditions according to one or more embodiments.

FIG. 11 is a flowchart illustrating a control example of face detection conditions according to one or more embodiments.

(Step S301) The face detection unit 320 applies a face detection condition in the HPD control processing. Here, a parameter of the face detection condition in the HPD control processing is set as parameter A. This parameter A is a condition to make the transition from the state where the user is not present in front of the information processing apparatus 1 (Absence) to the state where the user is present (Presence) in the HPD control processing.

(Step S303) When the held state is determined by the held state detection unit 333 (YES), the face detection unit 320 proceeds to a process in step S305. On the other hand, when it is determined by the held state detection unit 333 that the information processing apparatus 1 is not in the held state (NO), the face detection unit 320 applies the face detection condition in the HPD control processing of step S301.

(Step S305) The face detection unit 320 applies a face detection condition in the HID control processing. Here, a parameter of the face detection condition in the HID control processing is set as parameter B. This parameter B is a condition to make the transition from the state where the user is not present in front of the information processing apparatus 1 (Absence) to the state where the user is present (Presence) in the HID control processing. Here, a value easier to detect a face area than the parameter A is preset to the parameter B.

For example, the face detection unit 320 uses a face detection algorithm for detecting a face based on facial feature information, trained data (learned model) subjected to machine learning based on the facial feature information or a face image, a face detection library, or the like to acquire an evaluation value indicative of face likeness from the captured image (hereinafter called a "face detection evaluation value"), and detects, as a face area, an area in which the face detection evaluation value is a predetermined threshold value (hereinafter called a "face determination threshold value") or more. Further, when the time during which the face detection evaluation value further becomes the face determination threshold value or more lasts for a predetermined time (hereinafter called a "face determination time") or more, the face detection unit 320 may detect, as a face area, the area in which the face detection evaluation value is the face determination threshold value or more. For example, the face determination threshold value and the face determination time are set as parameters of the face detection conditions in the HPD control processing and the HID control processing.

FIG. 12 is a table illustrating an example of parameters of face detection conditions according to one or more embodiments. Here, as parameters of the face detection conditions, the face determination threshold value and the face determination time are preset. As for the face determination threshold value, the parameter A in the HPD control processing is set to a higher value (High), and the parameter B in the HID control processing is set to a lower value (Low). In other words, since the parameter B is set to a lower value than the parameter A in terms of the face determination threshold value, the parameter B is easier to be detected as a face area.

Note that when face determination threshold values are made different depending on the area among image areas of the captured image, the face determination threshold values may be set to relatively change from area to area in such a manner as to make the face determination threshold value in each area of the parameter B lower than the face determination threshold value in each area of the parameter A. For example, it is assumed in the parameter A that the determination threshold value of area X, detected as a face area until just before now among the image areas of the captured image, is set to a lower value than that of another area Y. In this case, the face determination threshold value of the area X in the parameter B is set to a lower value than the face determination threshold value of the area X in the parameter A. The face determination threshold value of the area Y in the parameter B is also set to a lower value than the face determination threshold value of the area Y in the parameter A. Further, even in the parameter B, the face determination threshold value of the area X is set to a lower value than the face determination threshold value of the area Y. In other words, the face determination threshold value of each area of the parameter B may be set to a value reduced by a given ratio to the face determination threshold value in each area of the parameter A.

Further, as for the face determination time, the parameter A in the HPD control processing is set to a longer time (Long), and the parameter B in the HID control processing is set to a shorter time (Short). In other words, since the parameter B is set to a shorter time than the parameter A in terms of the face determination time, the parameter B is easier to be detected as a face area.

Although the example of changing the face detection conditions from the parameter A to the parameter B along with the transition from the HPD control processing to the HID control processing when the held state is detected before the leave detection time elapses is described with reference to FIG. 11 and FIG. 12, the face detection conditions may also be changed from the parameter A to the parameter B along with the transition from the HPD control processing to the HID control processing in the same way even when there is HID input before the leave detection time elapses.

[Summary of One or More Embodiments]

As described above, the information processing apparatus 1 according to one or more embodiments includes: the system memory 304 (an example of a memory) which temporarily stores an OS program; the CPU 301 (an example of a first processor) which executes the OS program to implement OS functions; the face detection unit 320 (an example of a second processor) which performs face detection processing to detect a face area with a face captured therein from an image captured by the imaging unit 120. When the face area is no longer detected from a state where the face area is detected by the face detection unit 320, the CPU 301 performs HPD control processing (an example of first processing) to limit use of at least some of the functions of the OS (for example, to make the transition to the standby state) in response to the fact that the state where the face area is not detected has lasted for the predetermined leave detection time (an example of a first time). Further, when it is detected that the information processing apparatus 1 is held by the user (held state) before the leave detection time elapses, the CPU 301 disables the HPD control processing and performs HID control processing (an example of second processing) to limit at least some of the functions of the OS (for example, to make the transition to the standby state) in response to the fact that a state where there is no input by the user using the OS functions has lasted for a predetermined sleep setting time (an example of a second time).

Thus, since the information processing apparatus 1 can determine that the user is using the information processing apparatus 1 when it is detected that the information processing apparatus 1 is in the held state even in a case where the face area is no longer detected from the captured image, the transition to the standby state is not made. Then, when there is no HID input for a certain amount of time after that, the information processing apparatus 1 can determine that the user has really left and make the transition to the standby state. Therefore, the information processing apparatus 1 can improve robustness when detecting the user by face detection to control the operating state.

For example, the information processing apparatus 1 includes the sensor 180 (an acceleration sensor, an angular velocity sensor, or the like) for detecting the movement of the information processing apparatus 1 to detect whether or not the information processing apparatus 1 is in the held state (held by the user) based on the movement (shaking) of the information processing apparatus 1 detected by the sensor 180.

Thus, even in the case where the face area is no longer detected from the captured image, when the information processing apparatus 1 is held by the user, the information processing apparatus 1 can detect that effect to prevent the transition to the standby state by mistake.

Further, based on the fact that the face area is detected by the face detection unit 320 before the sleep setting time elapses in the HID control processing, the CPU 301 enables the HPD control processing, and when the face area is not detected again, the CPU 301 limits the use of at least some of the functions of the OS (for example, makes the transition to the standby state) in response to the fact that the state where the face area is not detected has lasted for the leave detection time.

Thus, since the information processing apparatus 1 does not make the transition to the standby state when the presence of the user can be determined before the sleep setting time elapses even if there is no HID input, the information processing apparatus 1 can control the operating state properly.

For example, the CPU 301 disables the HID control processing based on the fact that the face area is detected by the face detection unit 320 before the sleep setting time elapses in the HID control processing.

Thus, since the information processing apparatus 1 does not make the transition to the standby state when the presence of the user can be determined even without HID input while the face area is being detected by the face detection unit 320, the information processing apparatus 1 can control the operating state properly.

Further, the face detection unit 320 changes the detection conditions of the face area (face detection conditions) between when the HPD control processing is executed and when the HID control processing is executed by the CPU 301.

Thus, when the transition from the HPD control processing to the HID control processing is made in response to the fact that the held state is detected before the leave detection time elapses, since the user is likely not to leave, the information processing apparatus 1 can change the face detection conditions to make it easy to detect a face area.

For example, in the face detection processing, the face detection unit 320 detects, as a face area, an area in which the face detection evaluation value (an example of a face-likeness evaluation value) is the face determination threshold value (an example of a threshold value) or more from the captured image. Then, the face determination threshold value when the HID control processing is executed is set to a lower value than the face determination threshold value when the HPD control processing is executed.

Thus, when the transition from the HPD control processing to the HID control processing is made in response to the fact that the held state is detected before the leave detection time elapses, since the user is likely not to leave, the information processing apparatus 1 can change the face determination threshold value to a lower value to make it easy to detect a face area.

Further, when the face detection evaluation value is the face determination threshold value or more continuously for a predetermined face determination time (an example of a third time) from the captured image in the face detection processing, the face detection unit 320 detects, as a face area, an area in which the face detection evaluation value is the face determination threshold value or more. Then, the face determination time when the HID control processing is executed is set to a shorter time than the face determination time when the HPD control processing is executed.

Thus, when the transition from the HPD control processing to the HID control processing is made in response to the fact that the held state is detected before the leave detection time elapses, since the user is likely not to leave, the information processing apparatus 1 can change the face determination time to a shorter time to make it easy to detect a face area.

Further, when at least some of the functions of the OS are limited by the HID control processing (for example, the transition to the standby state is made), the CPU 301 enables the HPD control processing, while when the face area is detected by the face detection unit 320 again, the limitations on the OS functions limited by the HID control processing are released (for example, the transition from the standby state to the normal operating state is made).

Thus, when making the transition to the standby state after disabling the HPD control processing in response to the fact that the face area is no longer detected by the face detection unit 320, the information processing apparatus 1 can be booted by the HPD control processing after that.

For example, the leave detection time is set shorter than the sleep setting time.

Thus, since the probability that the user is not present is higher in the case where no face area is detected by the face detection unit 320 than in the case of no HID input, the information processing apparatus 1 can make the transition to the standby state as soon as possible to improve security.

Further, a control method for the information processing apparatus 1 according to one or more embodiments includes: a step in which when the face area is no longer detected from a state where the face area is detected by the face detection unit 320 (the example of the second processor), the CPU 301 (the example of the first processor) performs HPD control processing (the example of the first processing) to limit use of at least some of functions of the OS in response to the fact that a state where the face area is not detected has lasted for a predetermined leave detection time (the example of the first time) (for example, make the transition to the standby state); and a step in which when a state of the information processing apparatus 1 held by a user (held state) is detected before the leave detection time elapses, the CPU 301 disables the HPD control processing and performs HID control processing (the example of the second processing) to limit the use of at least some of the functions of the OS (for example, to make the transition to the standby state) in response to the fact that a state where there is no input by the user using the OS functions has lasted for a predetermined sleep setting time (the example of the second time).

Thus, since the information processing apparatus 1 can determine that the user is using the information processing apparatus 1 when it is detected that the information processing apparatus 1 is in the held state even in a case where the face area is no longer detected from the captured image, the transition to the standby state is not made. Then, when there is no HID input for a certain amount of time after that, the information processing apparatus 1 can determine that the user has really left and make the transition to the standby state. Therefore, the information processing apparatus 1 can improve robustness when detecting the user by face detection to control the operating state.

While one or more embodiments of this invention has been described in detail above with reference to the accompanying drawings, the specific configurations are not limited to the above-described one or more embodiments, and design changes are included without departing from the scope of this invention. For example, the respective configurations in one or more embodiments described above can be combined arbitrarily.

In the aforementioned one or more embodiments, the example in which the HID control processing is set to disabled when the face area is detected in the normal operating state is described, but the HID control processing may also be enabled in addition to the HPD control processing even when the face area is detected.

Further, in the aforementioned one or more embodiments, the configuration example in which the imaging unit 120 is built in the information processing apparatus 1 is described, but the imaging unit 120 does not have to be built in the information processing apparatus 1. For example, the imaging unit 120 may also be attachable to the information processing apparatus 1 (for example, onto the outer periphery of the display unit 110 or the like) and communicably connected to the information processing apparatus 1 wirelessly or by wire as an external accessory.

Further, in the aforementioned one or more embodiments, the information processing apparatus 1 detects a face area with a face captured therein from a captured image to detect the presence of the user, but the information processing apparatus 1 may also use a distance sensor (for example, a proximity sensor or the like) together to detect the distance to an object in order to detect the presence of the user. For example, the distance sensor is provided on the inner surface side of the first chassis 101 to detect an object (for example, a person) present within a detection range in a direction (frontward) to face the inner surface of the first chassis 101. As an example, the distance sensor may be an infrared distance sensor configured to include a light-emitting part for emitting infrared light and a light-receiving part for receiving reflected light which is the infrared light returned after emitted and reflected on the surface of the object. Note that the distance sensor may be a sensor using infrared light emitted by a light-emitting diode, or a sensor using an infrared laser emitting a light beam narrower in wavelength band than the infrared light emitted by the light-emitting diode. Further, the distance sensor is not limited to the infrared distance sensor, and it may be a sensor using any other method, such as an ultrasonic sensor or a sensor using a UWB (Ultra Wide Band) radar, as long as the sensor detects the distance to the object. Further, the distance sensor does not have to be built in the information processing apparatus 1, which may also be attachable to the information processing apparatus 1 (for example, onto the outer periphery of the display unit 110 or the like) and communicably connected to the information processing apparatus 1 wirelessly or by wire as an external accessory. Further, the imaging unit 120 and the distance sensor may be integrally constructed. Further, the information processing apparatus 1 may detect the presence of the user by detecting an area in which at least part of the body, not just a face, is captured.

Further, in the aforementioned one or more embodiments, the example in which the face area cannot be detected from the captured image because the face of the user deviates from the detection range FoV is described, but the present invention is not limited to this example. For example, when the user wears a mask while using the information processing apparatus 1, the face area may not be able to be detected. Further, when the body including the face within the detection range FoV is targeted for detection, the user may not be able to be detected when the body of the user deviates in addition to the deviation of the face of the user from the detection range FoV.

Further, the CPU 301 (the example of the first processor) and the chipset 303 (the example of the second processor) may be configured as individual processors, or may be integrated as one processor.

Further, in the aforementioned one or more embodiments, the example in which the face detection unit 320 is provided separately from the chipset 303 is illustrated, but some or all of the functions of the face detection unit 320 may be provided in the chipset 303, or provided in a processor integrated with the chipset 303. Further, some or all of the functions of the face detection unit 320 may be provided in the EC 200.

Further, a hibernation state, a power-off state, and the like may be included as the standby state described above. The hibernation state corresponds, for example, to S4 state defined in the ACPI specification. The power-off state corresponds, for example, to S5 state (shutdown state) defined in the ACPI specification. Note that the standby state, the sleep state, the hibernation state, the power-off state, and the like as the standby state are states lower in power consumption than the normal operating state (states of reducing power consumption).

Note that the information processing apparatus 1 described above has a computer system therein. Then, a program for implementing the function of each component included in the information processing apparatus 1 described above may be recorded on a computer-readable recording medium so that the program recorded on this recording medium is read into the computer system and executed to perform processing in each component included in the information processing apparatus 1 described above. Here, the fact that "the program recorded on the recording medium is read into the computer system and executed" includes installing the program on the computer system. It is assumed that the "computer system" here includes the OS and hardware such as peripheral devices and the like. Further, the "computer system" may also include two or more computers connected through networks including the Internet, WAN, LAN, and a communication line such as a dedicated line. Further, the "computer-readable recording medium" means a storage medium such as a flexible disk, a magneto-optical disk, a portable medium like a flash ROM or a CD-ROM, or a hard disk incorporated in the computer system. The recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the information processing apparatus 1, or delivery servers for delivering respective divided pieces of the program may be different from one another. Further, it is assumed that the "computer-readable recording medium" includes a medium on which the program is held for a given length of time, such as a volatile memory (RAM) inside a computer system as a server or a client when the program is transmitted through a network. The above-mentioned program may also be to implement some of the functions described above. Further, the program may be a so-called differential file (differential program) capable of implementing the above-described functions in combination with a program(s) already recorded in the computer system.

Further, some or all of the functions of the information processing apparatus 1 in the above-described one or more embodiments may be realized as an integrated circuit such as LSI (Large Scale Integration). Each function may be implemented by a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, in the aforementioned one or more embodiments, the example in which the information processing apparatus 1 is foldable PC capable of folding the display is described, but the present invention is not limited to this example. For example, the information processing apparatus 1 may also be a general laptop PC equipped with a keyboard, or a handy terminal such as a tablet PC or a smartphone, which can be any information processing apparatus capable of being used by the user while holding it in hand.

DESCRIPTION OF SYMBOLS 1 information processing apparatus
101 first chassis
102 second chassis
103 hinge mechanism
110 display unit
115 touch panel
120 imaging unit
140 power button
160 communication unit
170 storage unit
180 sensor
200 EC
300 main processing unit
301 CPU
302 GPU
303 chipset
304 system memory
310 system processing unit
311 HID processing unit
312 HID information acquisition unit
313 sleep timer
314 sleep instruction unit
315 operating state control unit
320 face detection unit
330 HPD processing unit
331 face detection information acquiring unit
332 HPD timer
333 held state detection unit
334 HPD information output unit
340 HID input detection unit
400 power supply unit

What is claimed is:

1. An information processing apparatus comprising:
a memory which temporarily stores a program of an OS (Operating System);
a first processor which executes the program to implement functions of the OS; and
a second processor which performs face detection processing to detect a face area with a face captured therein from an image captured by an imaging unit, wherein
when the face area is no longer detected from a state where the face area is detected by the second processor, the first processor performs first processing to limit use of at least some of the functions of the OS in response to the fact that a state where the face area is not detected has lasted for a predetermined first time,
when it is detected that the information processing apparatus is held by a user before the first time elapses, the first processor disables the first processing, and performs second processing to limit the use of at least some of the functions of the OS in response to the fact that a state where there is no input by the user using the OS functions has lasted for a predetermined second time,
the first processor enables the first processing based on the fact that the face area is detected by the second processor before the second time elapses in the second processing, and when the face area is no longer detected again, the first processor limits the use of at least some of the functions of the OS in response to the fact that a state where the face area is not detected has lasted for the first time,
the second processor changes detection conditions of the face area between when the first processing is executed and when the second processing is executed by the first processor,
the second processor detects, in the face area, an area in which a face-likeness evaluation value of the image processed by the face detection processing is a threshold value or more, and
the threshold value when the second processing is executed is set to a value lower than the threshold value when the first processing is executed.

2. The information processing apparatus according to claim 1, further comprising
a sensor for detecting movement of the information processing apparatus, wherein
the first processor detects whether the information processing apparatus is held by the user based on the movement of the information processing apparatus detected by the sensor.

3. The information processing apparatus according to claim 1, wherein the first processor disables the second processing based on the fact that the face area is detected by the second processor before the second time elapses in the second processing.

4. The information processing apparatus according to claim 1, wherein
when the evaluation value is the threshold value or more continuously for a predetermined third time from the image in the face detection processing, the second processor detects, as the face area, an area in which the evaluation value is the threshold value or more, and
the third time when the second processing is executed is set to a time shorter than the third time when the first processing is executed.

5. The information processing apparatus according to claim 1, wherein when at least some of the functions of the OS are limited by the second processing, the first processor enables the first processing, while when the face area is detected by the second processor again, the limitations on the OS functions limited by the second processing are released.

6. The information processing apparatus according to claim 1, wherein the first time is set shorter than the second time.

7. A control method for an information processing apparatus including: a memory which temporarily stores a program of an OS (Operating System); a first processor which executes the program to implement functions of the OS; and a second processor which performs face detection processing to detect a face area with a face captured therein from an image captured by an imaging unit, the control method comprising:
- a step in which when the face area is no longer detected from a state where the face area is detected by the second processor, the first processor performs first processing to limit use of at least some of the functions of the OS in response to the fact that the state where the face area is not detected has lasted for a predetermined first time; and
- a step in which when it is detected that the information processing apparatus is held by a user before the first time elapses, the first processor disables the first processing, and performs second processing to limit use of at least some of the functions of the OS in response to the fact that a state where there is no input by the user using the functions of the OS has lasted for a predetermined second time, wherein the first processor enables the first processing based on the fact that the face area is detected by the second processor before the second time elapses in the second processing, and when the face area is no longer detected again, the first processor limits the use of at least some of the functions of the OS in response to the fact that a state where the face area is not detected has lasted for the first time, the second processor changes detection conditions of the face area between when the first processing is executed and when the second processing is executed by the first processor, the second processor detects, in the face area, an area in which a face-likeness evaluation value of the image processed by the face detection processing is a threshold value or more, and the threshold value when the second processing is executed is set to a value lower than the threshold value when the first processing is executed.

* * * * *